United States Patent [19]
Tomioka et al.

[11] Patent Number: 6,006,107
[45] Date of Patent: Dec. 21, 1999

[54] RADIO TELECOMMUNICATION APPARATUS AND METHOD HAVING STORED SYSTEM IDENTIFICATION NUMBERS

[75] Inventors: Munehisa Tomioka; Shinya Takahashi, both of Tokyo, Japan

[73] Assignee: Kabushiki Kaisha Toshiba, Kawasaki, Japan

[21] Appl. No.: 08/841,305

[22] Filed: Apr. 30, 1997

Related U.S. Application Data

[63] Continuation of application No. 08/415,037, Mar. 31, 1995, abandoned, which is a continuation of application No. 07/962,352, Oct. 16, 1992, abandoned.

[30] Foreign Application Priority Data

Oct. 16, 1991 [JP] Japan .................................. 3-267735

[51] Int. Cl.$^6$ ...................................................... H04Q 7/32
[52] U.S. Cl. .......................... 455/552; 455/432; 455/434
[58] Field of Search ................................... 455/432, 433, 455/435, 38.2, 525, 434, 552, 553, 575, 455, 558

[56] References Cited

U.S. PATENT DOCUMENTS

| | | | |
|---|---|---|---|
| 4,032,723 | 6/1977 | Mendoza | 370/281 |
| 4,233,473 | 11/1980 | Frost | 455/432 |
| 4,475,010 | 10/1984 | Huensch et al. | 370/334 |
| 4,535,200 | 8/1985 | Himmelbauer et al. | 455/411 |
| 4,593,273 | 6/1986 | Narcisse | 455/69 |
| 4,672,657 | 6/1987 | Dershowitz | 455/464 |
| 4,677,653 | 6/1987 | Weiner et al. | 455/434 |
| 4,734,928 | 3/1988 | Weiner et al. | 455/434 |
| 4,737,976 | 4/1988 | Borth et al. | 455/563 |
| 4,742,560 | 5/1988 | Arai | 455/434 |
| 4,761,806 | 8/1988 | Toki | 455/564 |
| 4,775,995 | 10/1988 | Chapman et al. | 455/550 |
| 4,775,999 | 10/1988 | Williams | 455/435 |
| 4,802,201 | 1/1989 | Yoshizawa et al. | 455/411 |
| 4,831,647 | 5/1989 | D'Avello et al. | 455/558 |
| 4,833,701 | 5/1989 | Comroe et al. | 455/432 |
| 4,833,702 | 5/1989 | Shitara et al. | 455/435 |
| 4,891,638 | 1/1990 | Davis | 455/455 |
| 4,903,322 | 2/1990 | Inahara et al. | 455/514 |
| 4,905,301 | 2/1990 | Krolopp et al. | 455/434 |
| 4,916,728 | 4/1990 | Blair | 455/432 |
| 5,012,234 | 4/1991 | Dulaney et al. | 455/186.1 |
| 5,020,091 | 5/1991 | Krolopp et al. | 455/434 |
| 5,042,063 | 8/1991 | Sakanishi et al. | 379/88.03 |
| 5,068,889 | 11/1991 | Yamashita | 455/411 |
| 5,086,513 | 2/1992 | Lawrence et al. | 455/186.1 |
| 5,101,500 | 3/1992 | Marui | 455/434 |
| 5,159,625 | 10/1992 | Zicker | 455/552 |

FOREIGN PATENT DOCUMENTS 0 260 763 A3 12/1988 European Pat. Off. .
2 172 775 9/1986 United Kingdom .

*Primary Examiner*—Edward F. Urban
*Attorney, Agent, or Firm*—Banner & Witcoff, Ltd.

[57] ABSTRACT

A radio telecommunication apparatus stores one or more system identification numbers. When the apparatus receives a system identification number transmitted over a radio channel, the received system identification number is compared with each of one or more stored system identification numbers. When the received system identification number coincides with one of the stored system identification numbers, the apparatus is enabled to communicate with a base unit.

50 Claims, 11 Drawing Sheets

RADIO TELECOMMUNICATION APPARATUS AND METHOD HAVING STORED SYSTEM IDENTIFICATION NUMBERS

This application is a CONTINUATION of application Ser. No. 08/415,037, filed Mar. 31, 1995, now abandoned; which is a continuation of Ser. No. 07/962,352, filed Oct. 16, 1992; which is abandoned.

BACKGROUND OF THE INVENTION

1. Field of the Invention

The present invention relates to the field of radio telecommunication apparatuses used in a radio telecommunication system such as a motor vehicle radio telephone system and a portable radio telephone system and, more particularly, to a radio telecommunication apparatus able to display whether the apparatus is located in its service area.

2. Description of the Related Art

A cellular radio communication system will be described with reference to FIG. 11. The system comprises control station CS connected with wire telephone network NW, a plurality of base stations BS1–BSn, which are respectively connected with control station CS via landlines CL1–CLn, and a plurality of mobile radio apparatuses MS1–MSn. Each of these base stations BS1–Bsn has its own radio zone E1–En, respectively. The mobile radio apparatuses MS1–Msn may be in communication with the base stations BS1–Bsn via radio links in the radio zones E1–En. If an apparatus user travels out of zone E1 and enters another zone E2, a radio link is established between the apparatus and base station BS2 instead of between the apparatus and base station BS1.

A plurality of zones (E1–En) provides a service area. Furthermore, a plurality of service areas are provided in a cellular radio system. Each of the service areas is controlled by its respective control station. If an identification number of the apparatus is registered in a control station, the service area is called a home area. Otherwise, the area is called a roam area.

User fees for calls from the cellular radio telephone apparatus in a roam area are higher than the fees in a home area. When a calling party is located in a roam area and originates a call, a high fee is usually charged for the communication.

Further, when a party is called and receives an incoming signal while located in a roam area, a high fee is charged for the communication.

Still further, each of the roam areas are serviced by different service companies. Therefore, user fees for calls from an apparatus in one roam area are different from those in another roam area.

In order to reduce user fees, users normally do not wish to communicate with a "high charge" service area. However, when the calling party is located in the "high charge" service area and originates a call, the conventional radio telecommunication apparatus is obliged to be connected with that system. Further, when the called party is located in the "high charge" service area and receives an incoming signal, the conventional apparatus is obliged to be connected with that system.

SUMMARY OF THE INVENTION

It is accordingly an object of the present invention to provide a radio telecommunication apparatus which is connected with one or more systems with which a user wishes to communicate.

It is a further object of the present invention to provide a radio telecommunication apparatus which enables the user to reduce user fees for calls as much as possible.

It is a still further object of the present invention to provide a radio telecommunication apparatus that is disconnected from or unable to be connected to a system with which a user does not wish to be connected to when the apparatus is moved into a "high charge" service area corresponding to this undesirable system after the apparatus has been initialized.

According to this invention, the apparatus stores one or more system identification numbers. When the apparatus receives a system identification number transmitted over a radio channel, the received system identification number is compared with each of the one or more stored system identification numbers. When the received system identification number coincides with (i.e. is the same as) one of the one or more stored system identification numbers, the apparatus is enabled to communicate with a base unit.

According to another invention, when the apparatus seizes a first channel, and a first received system identification number communicated over the first channel coincides with one of the stored system identification numbers, the apparatus is allowed to be connected with that system. Further, when the apparatus seizes a second channel and a second received system identification number communicated over the second channel does not coincide with any one of the stored system identification numbers, the apparatus is unable to be connected with the new system corresponding to the second received system identification number.

DESCRIPTION OF THE PREFERRED EMBODIMENTS

A radio telecommunication apparatus in accordance with the present invention will be described with reference to the attached drawings.

Figure 1:
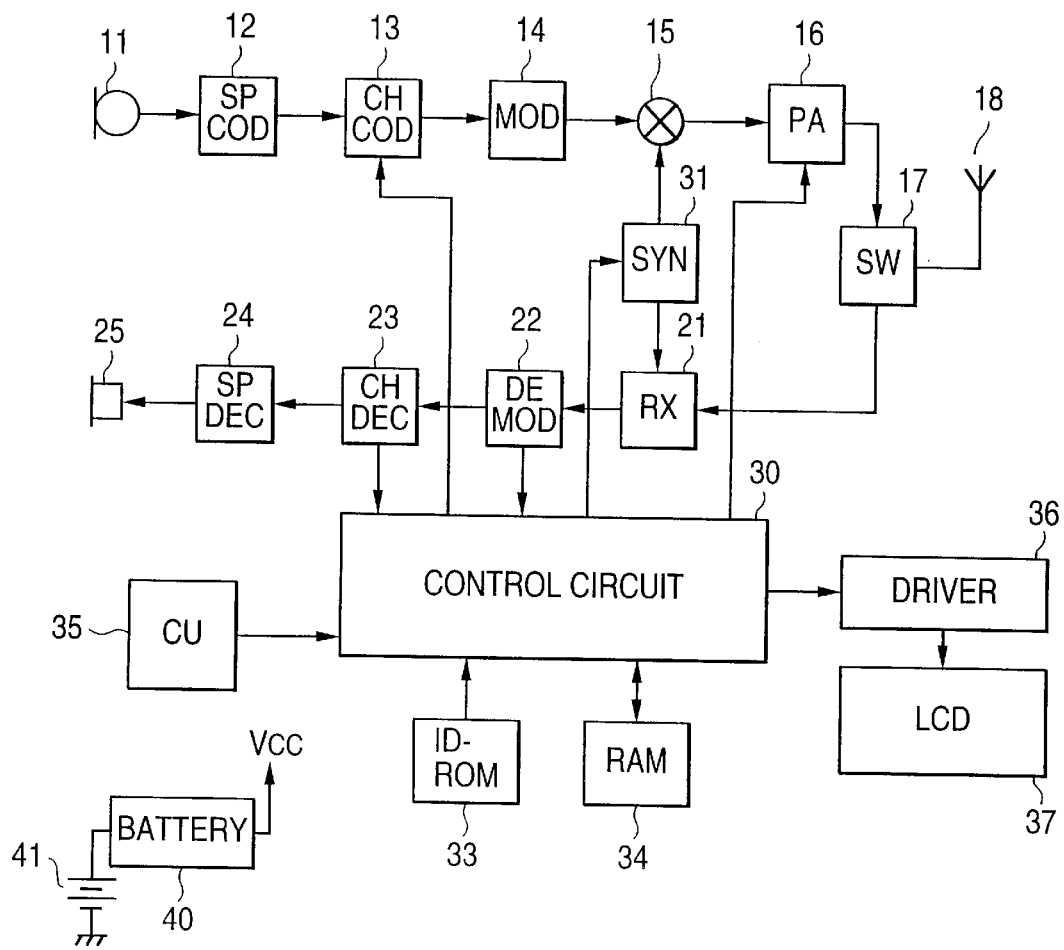
FIG. 1 is a block diagram illustrating an arrangement of a mobile telephone apparatus according to an embodiment of the present invention.

Referring first to FIG. 1, there is shown a block diagram of a radio telephone apparatus in accordance with an embodiment of the present invention.

The radio telephone apparatus is roughly divided into transmission, reception and control sections. Reference numeral 40 denotes a power supply, such as a battery. The transmission section comprises microphone 11, speech coder (SPCOD) 12, error correction coder (CHCOD) 13, digital modulator (MOD) 14, adder 15, power amplifier (PA) 16, high frequency switch circuit (SW) 17 and antenna 18.

A transmitted audio signal from microphone 11 is subjected to a coding operation at speech coder 12. Speech coder 12 outputs a digital transmit signal. Error correction coder 13 performs its error correction coding operation over the digital transmit signal and a digital control signal issued from control circuit 30 (which will be explained later).

Digital modulator 14 generates a modulation signal corresponding to the digital transmit signal issued from error correction coder 13. Adder 15 adds the modulation signal received from digital modulator 14 and a carrier signal received from synthesizer 31 for frequency conversion. Power amplifier 16 amplifies the high frequency signal received from adder 15 into a predetermined level.

High frequency switch 17 is turned ON only for a period of time corresponding to a transmit time slot specified by control circuit 30. During this time, high frequency switch 17 receives the transmit signal from power amplifier 16 and supplies it to antenna 18. The transmit signal is transmitted toward a base station (not shown) in the form of a radio transmit signal.

The receiver section includes receiver (RX) 21, digital demodulator (DEMOD) 22, error correction decoder (CHDEC) 23, speech decoder (SPDEC) 24 and speaker 25.

Receiver 21 performs its frequency converting operation over a radio receive signal received from antenna 18 through high frequency switch 17. Digital demodulator 22 performs its bit and frame synchronizing operations over a receive signal received from receiver 21 to obtain a synchronized signal and supplies the synchronized signal to control circuit 30. The bit and frame synchronizing operations are defined as word synchronization. Error correction decoder 23 performs its error correction decoding operation over a digital demodulation signal received from digital demodulator 22 to obtain a digital receive signal. Further, error correction decoder 23 provides a digital control signal for scanning channels and communication to control circuit 30.

The digital receive signal issued from error correction decoder 23 is sent to speech decoder 24. Speech decoder 24 performs its decoding operation over the digital receive signal so that the digital receive signal is converted into an analog receive signal. The analog receive signal is then sent to speaker 25.

Further, the control section includes aforementioned control circuit 30, aforementioned frequency synthesizer (SYN) 31, ID-ROM 33 for storing system identification numbers, RAM 34 for storing control data, console unit (CU) 35, LCD driver 36, and LCD 37. Synthesizer 31 generates an oscillation frequency necessary for radio communication with the base station under control of control circuit 30.

ID-ROM 33 is an E²PROM having a registration area. A system identification number is assigned to each of a plurality of systems. The system identification number is transmitted from the base station and defined as SIDM in this specification.

Figure 8:
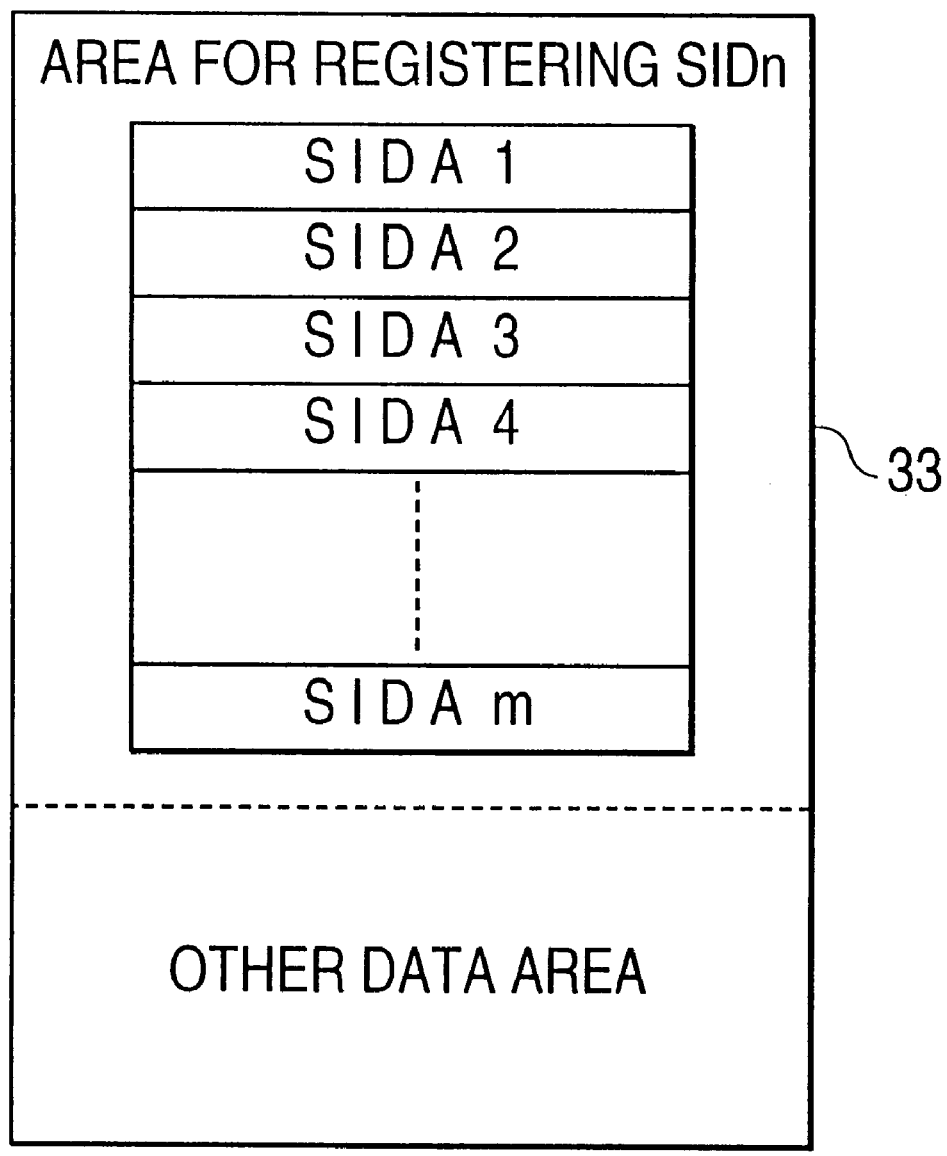
FIG. 8 is a chart illustrating the contents of an ID-ROM of FIG. 1 which stores system identification numbers.

In the event that a user wishes to communicate with specific systems, system identification numbers corresponding to those systems are stored in the ID-ROM 33 and defined as SIDAn (n=1–m), as illustrated in FIG. 8.

Telephone numbers from console unit 34 and the SIDM from the base station are stored in RAM 34. Console unit 35 has a keypad including a dialing key and a call origination key. LCD 37 is driven by driver 36 and displays information for operating the telephone.

Control circuit 30 detects the system identification number (SIDM) transmitted from the base station. The SIDM is compared with the SIDAn (n=1–m) stored in ID-ROM 33. When one of the SIDAn coincides with (i.e., is the same as) the SIDM, the telephone apparatus is allowed to be connected with the system corresponding to the SIDM. When none of SIDAn coincides with the SIDM, the apparatus is not allowed to be connected with the system. This information is displayed on LCD 37.

A connection control operation of the telephone apparatus will now be described with reference to FIG. 2. When a power switch is turned on, a reset operation starts (step 2a). This operation is described with reference to FIG. 3.

In response to a power switch, control circuit 30 resets each section (step 3a). After that, whether the apparatus is allowed to be used or not is checked. This check is defined as a lock state check (step 3b). As long as the lock state is not cancelled, another party is not allowed to operate the apparatus. In this state, "LOCK" is displayed on the LCD (step 3c). In the event that the apparatus is not set to be in the "Lock state", "NO SVC" is displayed (step 3d). "NO SVC" means that a link with a communication service is not available during the reset operation. After the reset operation, an initialization starts (step 2b).

Figure 4:
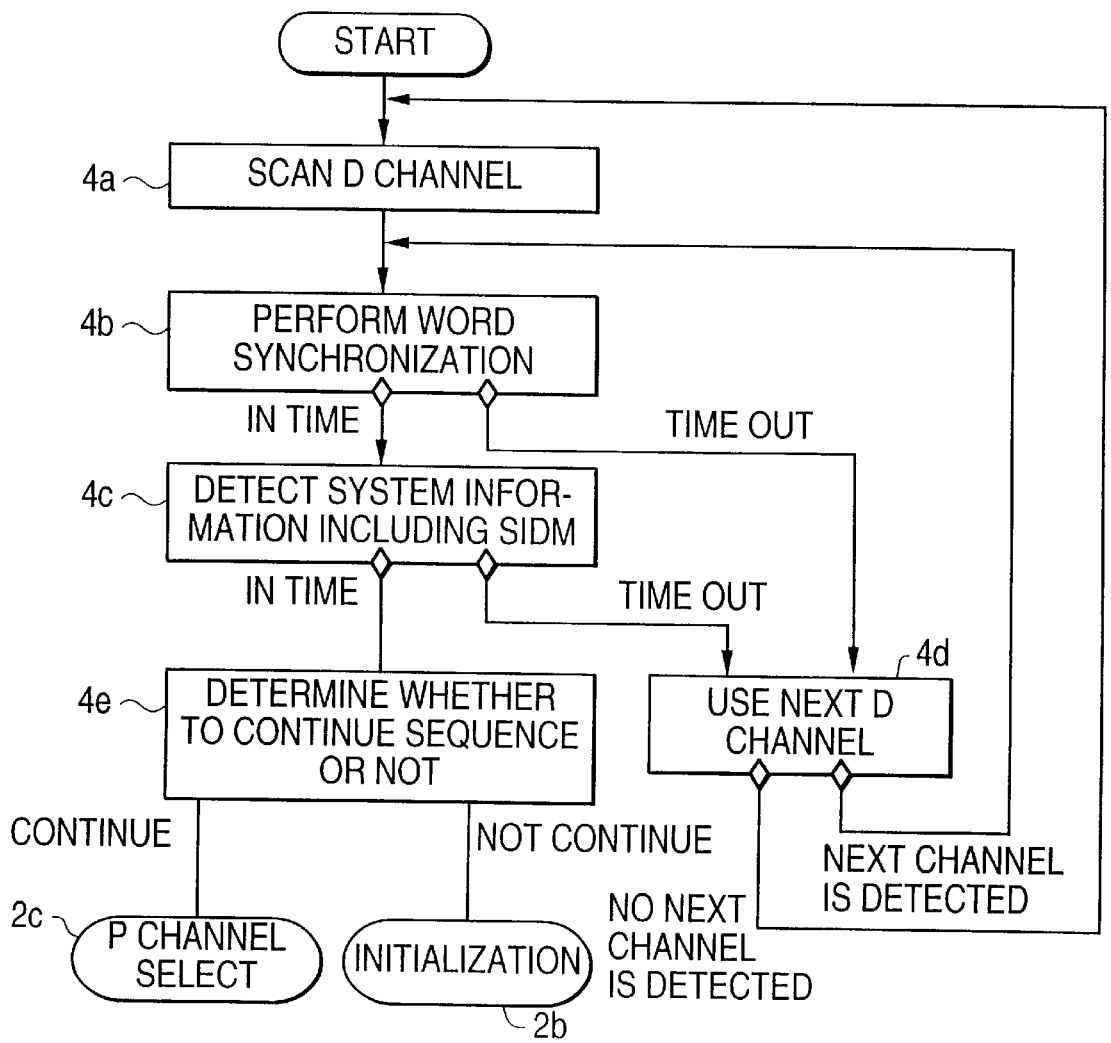
FIG. 4 is a flow chart illustrating an initialization operation step in the connection control operation of FIG. 2.

FIG. 4 is a detailed flow chart which illustrates the initial radio channel connection operation, defined as the initialization. Control circuit 30 controls synthesizer 31 to change the frequency of output therefrom. Thereby, a predetermined range of control channels (referred to as D channels hereinafter) are scanned in the demodulator to obtain the information indicative of electric field intensity of the received signals over each channel (step 4a). The channel having the strongest electric field intensity is selected from the D channels and the apparatus is ready for receiving signals through the D channel having the strongest electric field intensity. In this case, information of a channel having the second strongest intensity is also obtained.

Control circuit 30 performs bit and frame synchronization operations (referred to as a word synchronization) on signals received through the selected D channel (step 4b). If the word synchronization is performed within a predetermined period of time, system information is detected by signals received through this D channel (step 4c).

The system information includes a system identification number (SIDM) and a range of frequency channels (referred to as P channels hereinafter) to be scanned next. If the system information is detected within a predetermined period of time, control circuit 30 compares the received SIDM with each of the system identification numbers stored in ID-ROM 33 (referred to as SIDAn). Responsive to the result of this comparison, control circuit 30 determines whether to continue the communication sequence or not (step 4e).

Figure 9:
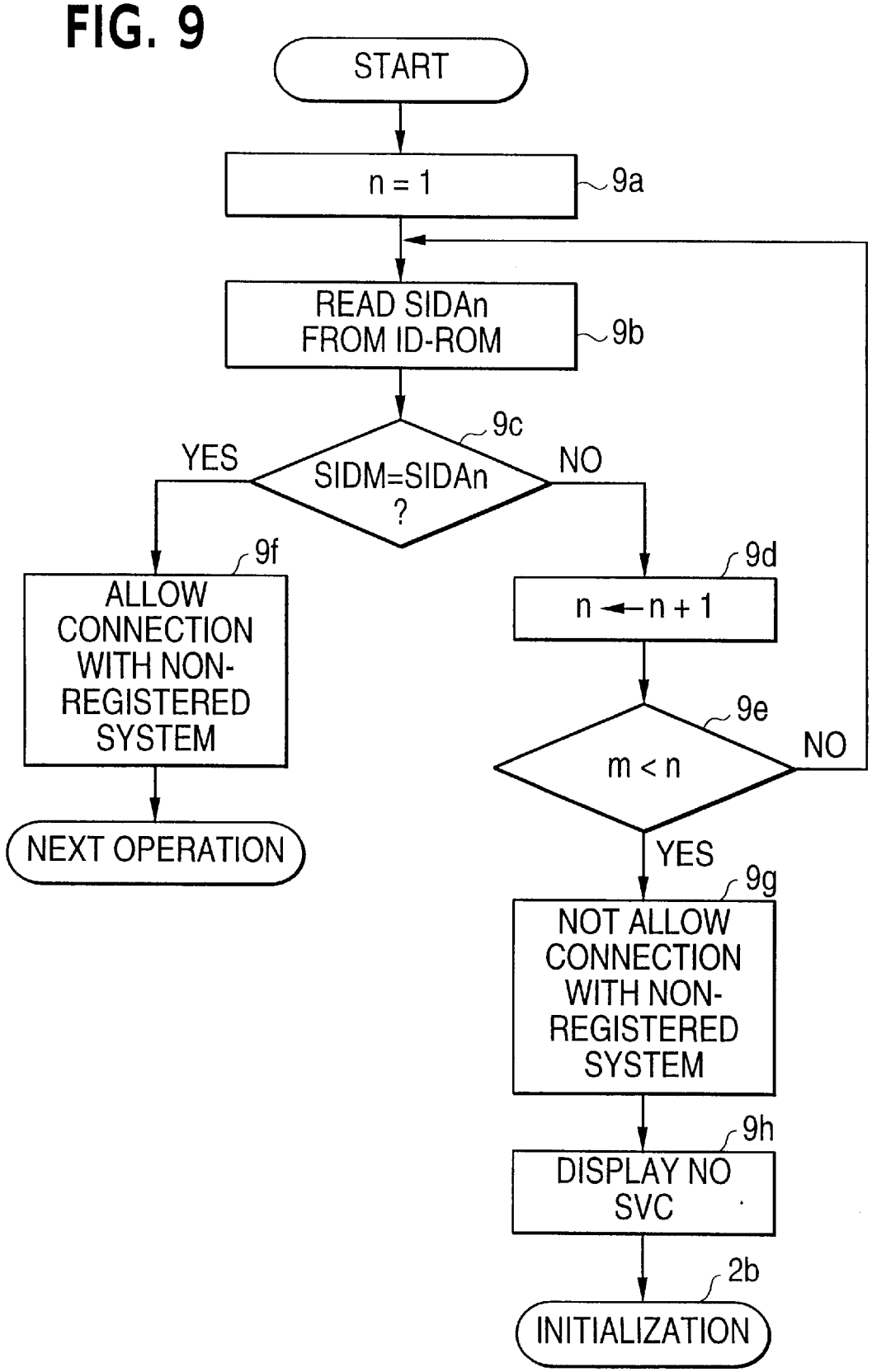
FIG. 9 is a flow chart illustrating a determining operation sequence according to an embodiment of the present invention in the operations of FIG. 4, FIG. 6 and FIG. 7.

This operation is illustrated by FIG. 9. When "n" is set to be "1" (step 9a), SIDA1 is read from the ID-ROM 33 (step 9b). The ID-ROM 33 has a plurality of SIDAn (n=1–m) as illustrated by FIG. 8. Control circuit 30 compares the received SIDM with the SIDA1 (step 9c). In the event that the received SIDM does not coincide with (i.e., is not the same as) the SIDA1, the value of "n" is increased (step 9d). The comparison in step 9c is performed until the value of "n" is larger than the value of "m" (step 9e).

If the received SIDM coincides with (i.e. is the same as or identical to) one of the stored SIDAn, control circuit 30 regards the system having the received SIDM as a system with which the user wishes the apparatus to be connected. After that, control circuit 30 allows the apparatus to be connected with the system (step 9f) and performs a P channel scan operation. If the received SIDM does not coincide with any of the SIDAn, control circuit 30 does not allow the apparatus to be connected with the system (step 9g). Thereafter, "NO SVC" is displayed (step 9h) and initialization is resumed (step 2b).

Referring to FIG. 4 again, if the word synchronization or the system information reception is not performed within a predetermined period of time, the D channel having the second strongest intensity is used to repeat the above operation (step 4d). In this case, if word synchronization or system information reception is again not performed within the predetermined period of time, the control circuit scans the D channels again (step 4a).

When the above initialization operations are completed, control circuit 30 continues the communication sequence and performs scanning similar to the above scanning operation for the P channels for receiving an incoming signal (step 2c).

Figure 5:
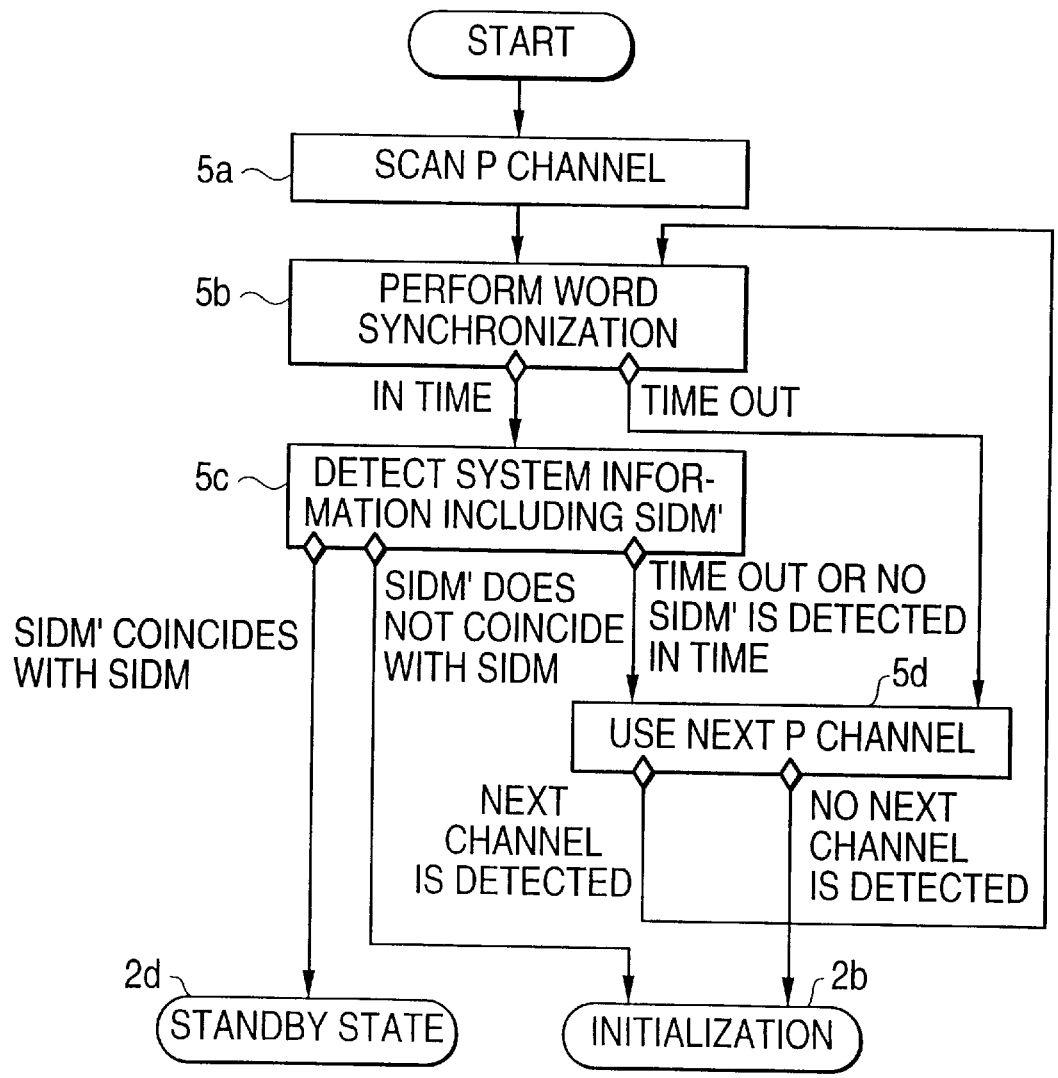
FIG. 5 is a flow chart illustrating an operation after initialization in the connection control operation.

FIG. 5 is a detailed flow chart which illustrates the P channel connection after initialization. Control circuit 30 causes the demodulator to scan the P channels to obtain information indicative of the electric field intensity of the received signals. The apparatus is ready for receiving information through the P channel having the strongest electric field intensity. In this case, information indicative of the P channel having the second strongest intensity is also obtained (step 5a).

The word synchronization operation is performed on signals received through the P channel having the strongest electric field intensity (step 5b). After that, control circuit 30 obtains system information including SIDM' and compares this SIDM' received through the P channel with the SIDM received through the D channel which is temporarily stored in RAM 34 (step 5c). If the SIDM' received through the P channel coincides with the SIDM received through the D channel, the apparatus is set in a receive standby mode (step 2d). Otherwise, initialization is resumed (step 2b).

If the word synchronization is not performed or the system information or SIDM' is not obtained within a predetermined period of time, an operation similar to the one described above is performed for the P channel having the second strongest intensity (step 5d). When the word synchronization or the system information reception is again not performed within a predetermined period of time, initialization is resumed (step 2b).

Figure 2:
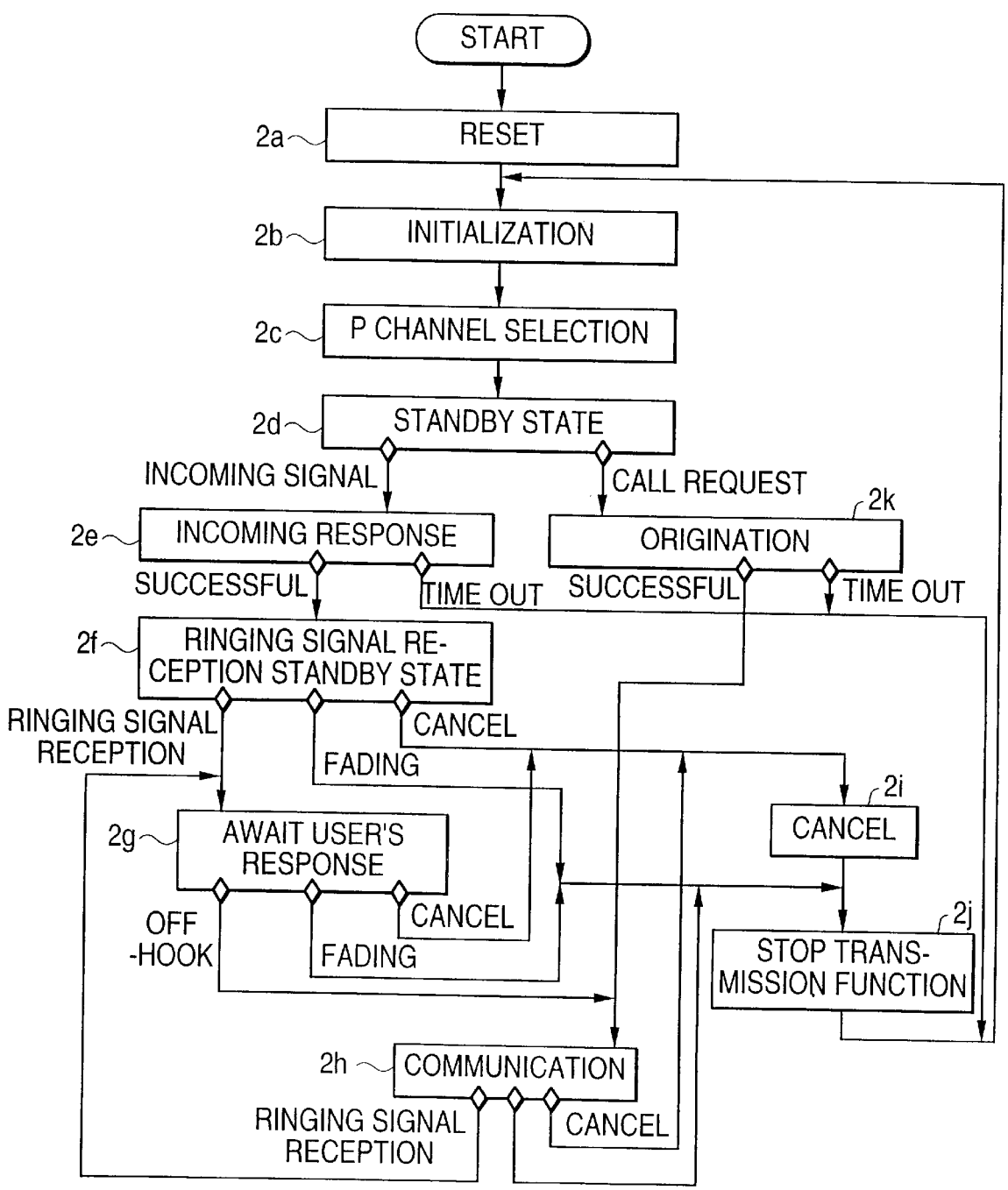
FIG. 2 is a flow chart illustrating a connection control operation sequence in the cellular telephone system of the present invention.
Figure 3:
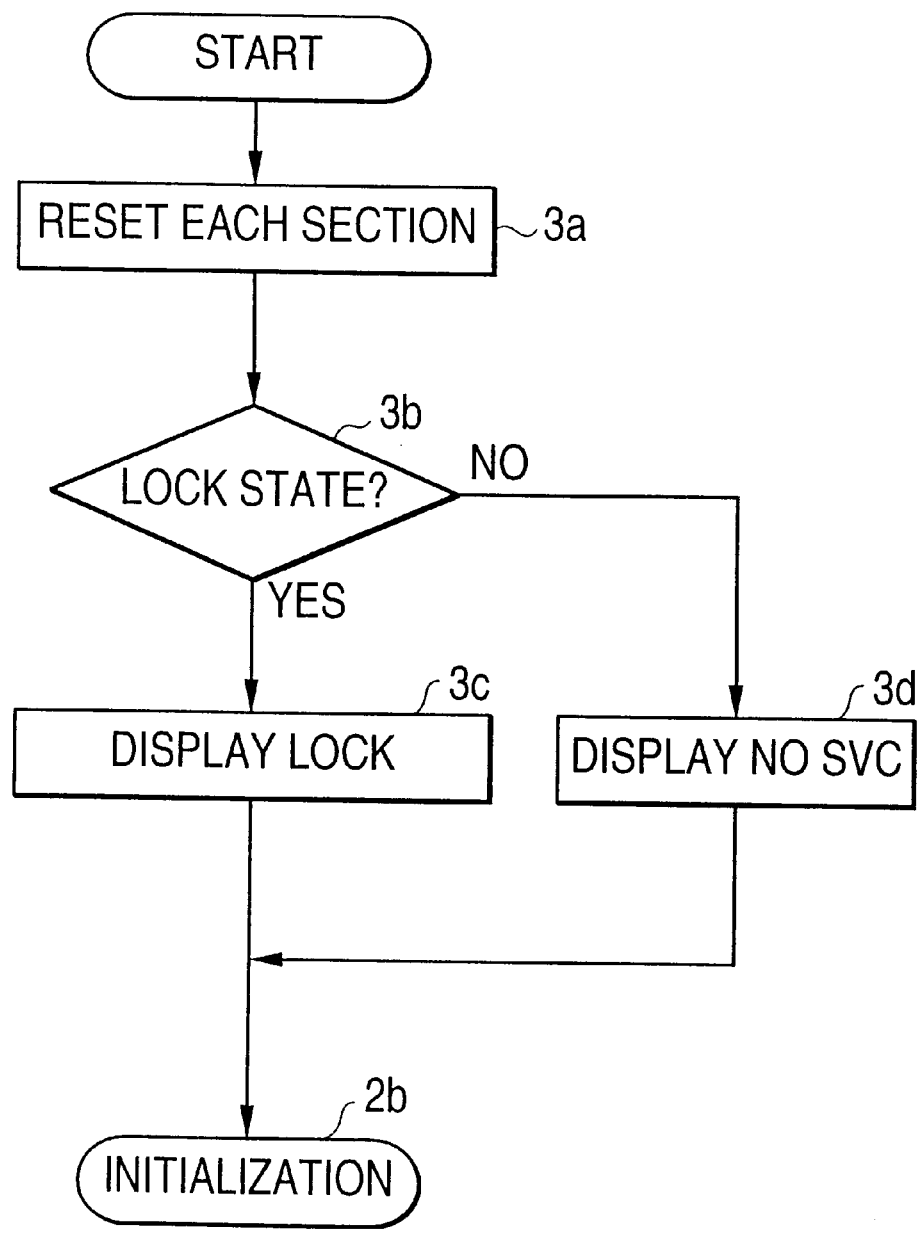
FIG. 3 is a flow chart illustrating a reset operation step in the connection control operation of FIG. 2.
Figure 6:
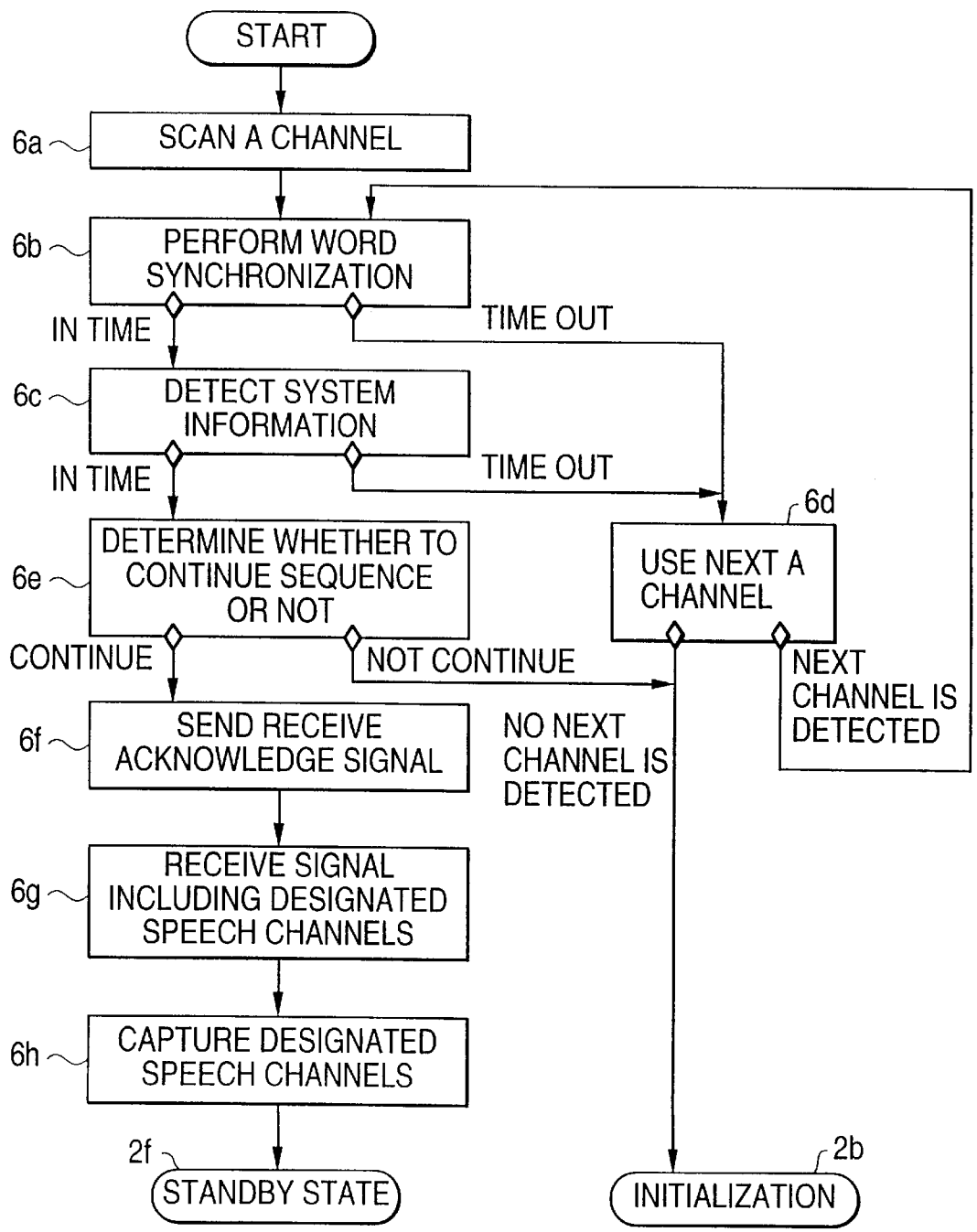
FIG. 6 is a flow chart illustrating an incoming response operation sequence in the connection control operation.

In the standby state in step 2d of FIG. 2, if the apparatus receives an incoming signal, an incoming response sequence is performed (step 2e). The sequence is illustrated by FIG. 6.

Control circuit 30 causes the demodulator to scan each predetermined control channel (defined as A channels) to obtain reception electric field intensity information. In this case, information indicative of the control channel having the second strongest electric field intensity is also obtained.

Next, a word synchronization is performed on signals received through the selected A channel (step 6b). If the word synchronization is performed within a predetermined period of time, system information is detected by signals received through this A channel (step 6c). Thereafter, control circuit 30 determines whether to continue sequence (step 6e). The operation is similar to the operation illustrated in FIG. 9. If the word synchronization is not performed or the system information is not obtained within a predetermined period of time, the A channel having the second strongest intensity is used to repeat the above operation (step 6d). In this case, if word synchronization is again not performed or system reception is again not obtained within a predetermined period of time, initialization is resumed (step 2b).

In the operation of step 6e, if the received SIDM coincides with one of the SIDAn stored in the ID-ROM 33, a receive acknowledge signal is sent through the selected A channel to the base station (step 6f). Thereafter, a signal including information indicative of designated speech channels is received (step 6g). Thereafter, a shortened burst signal is sent to the base station and a time alignment is performed.

In this state, the A channels are switched to the designated speech channels (called DT channels) which include a forward channel for transmitting audio signals to the base station and a backward channel for receiving audio signals from the calling apparatus (step 6h). Thereby a communication link has been established between the calling telephone apparatus and the called apparatus.

The apparatus is set to be in standby state for receiving an incoming signal (step 2f in FIG. 2). When a calling signal is received, the apparatus generates a ringing tone. In this state, the apparatus is set to await the user's response (step 2g).

When the user responds to the ringing tone by taking the handset or depressing a "SEND" key, control circuit 30 performs a communication link with the calling party (step 2h).

When the electric field intensity of the speech channels is less than a predetermined level because of fading occurring for more than a predetermined period of time, the transmission function is disabled (step 2j). During communication, when the user puts the handset on-hook, the communication through the speech channels is ceased (step 2i). Thereafter, when the transmission function is disabled (step 2j), initialization is resumed (step 2j).

Figure 7:
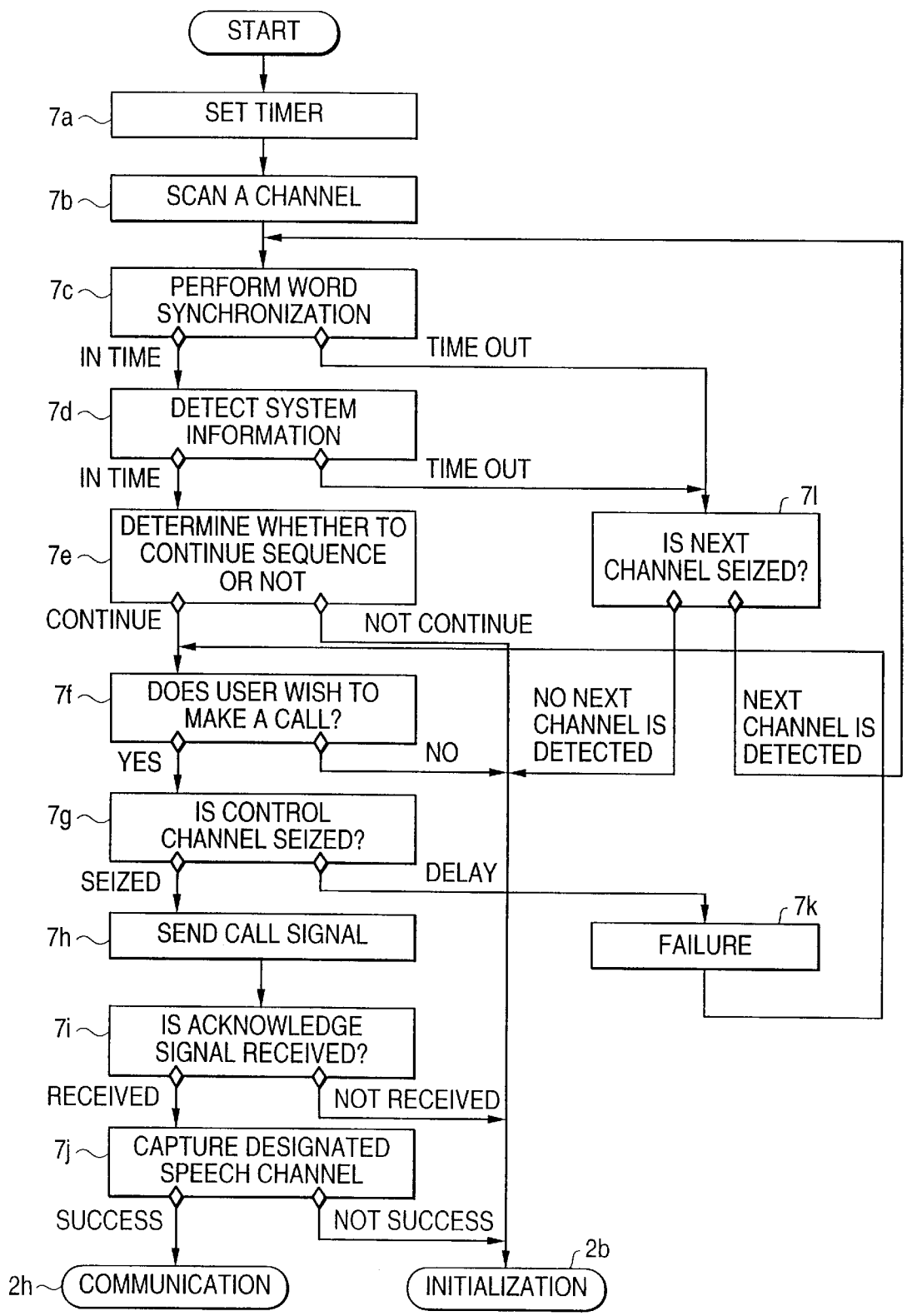
FIG. 7 is a flow chart illustrating a call origination operation sequence in the connection control operation.

In the standby state in step 2d of FIG. 2, when a call request is detected by an input at console unit 35 or a voice dialing, a call origination operation starts (step 2k). This operation is illustrated by FIG. 7. A timer for counting a call reception time is set (step 7a). The set time is, e.g., 12 seconds.

Thereafter, control circuit 30 causes the demodulator to scan each predetermined A channel (control channel) to obtain reception electric field intensity information. The channel having the strongest electric field intensity is selected from these control channels and the apparatus is set to receive signals through the control channel having the strongest intensity. In this case, information indicative of the control channel having the second strongest electric field intensity is also obtained (step 7b).

Next the word synchronization operation is performed on signals received through the selected A channel (step 7c). If the word synchronization operation is performed within a predetermined period of time, system information is detected from signals received through this control channel (step 7d). The control circuit obtains an SIDM from the received system information and compares the obtained SIDM with the SIDAn (n=1–m) stored in ID-ROM 33 and determines whether to continue the sequence or not. This operation in step 7e is similar to the operation illustrated in FIG. 9.

Referring to FIG. 9 in the event that the obtained SIDM coincides with one of the stored SIDAn, the control circuit allows the apparatus to be connected with the system. If the received SIDM does not coincide with any of the SIDAn, the apparatus is not allowed to be connected with the system and initialization is resumed (step 2b). Referring to FIG. 7 again, if word synchronization cannot be performed or system information is not obtained within predetermined period time, the same operation is performed using the control channel having the second strongest intensity (step 7l). In this case, if no word synchronization can be performed or no system information is obtained, initialization is resumed (step 2b).

The presence of the user's will is checked (step 7f). This check is performed as follows. If the user enters a telephone number to be called on the console unit and depress the "SEND" key, these key inputs are detected and a call flag in the control circuit is set at a logic "1".

In this case, the apparatus determines that the user wishes to make a call. However, if the user depresses the "END" key after depression of the "SEND" key, the call flag is reset at a logic "0". In this case, the apparatus determines that the user does not wish to make a call and initialization is resumed (step 2b).

When the call flag is at the logic "1", the control circuit confirms whether the selected control channel is appropriate for the origination signal to be broadcast by analyzing the system information signal from a base station (step 7g). If the selection of an appropriate channel is delayed (step 7k), the apparatus checks again whether the user wishes to make a call (step 7f).

If the control circuit detects that the user's will to make a call is confirmed and an appropriate control channel for broadcast of an origination signal is selected, a call origination signal including the telephone number to be called, which is entered by the user, is transmitted over this control channel (step 7h).

Thereafter, the apparatus detects whether the acknowledge signal from the base station has been received (step 7i). When the acknowledge signal is received, a slot synchronization is performed. After that, a shortened burst signal is sent to the base station and a time alignment is performed.

The acknowledge signal includes information indicative of designated speech channels. The base station calls the other party to be called on the basis of the telephone number included in the origination signal. A communication link over the designated channels may then be established between the apparatus and the called apparatus (step 7j) otherwise, initialization is resumed (step 2b).

As has been described, the SIDM detected from the system information is compared with the SIDAn (n=1–m) stored in the ID-ROM in the initialization sequence, the incoming response sequence and the call origination sequence. In the event that the SIDM does not coincide with the SIDAn, the apparatus is not allowed to be connected with the system having that SIDM.

Accordingly to this embodiment, if the apparatus is located in an the area corresponding to a system with which the user does not wish the apparatus to be connected, the apparatus is set to be disconnected from the system.

When the apparatus is located in a first area corresponding to a first system with which the user wishes the apparatus to be connected (this system is defined as a willing system), the apparatus maintains connection with the base unit during initialization. Thereafter, if the apparatus moves from the first area to a second area corresponding to a second system with which the user does not wish the apparatus to be connected (this system is defined as an unwilling system), the apparatus is prevented from being connected with the second unwilling system in the incoming response sequence or the call origination sequence. Accordingly, this embodiment prevents the user from paying a high fee as compared with the conventional apparatus connected with the unwilling system.

This operation is performed not only in initialization sequence, but also in the incoming response sequence and in the call origination sequence. Accordingly, when the apparatus moves from the first area corresponding to the first willing system to the second area corresponding to the second unwilling system after the initialization operation, the apparatus is set to be disconnected from the second unwilling system.

Since the apparatus displays "NO SVC" when the SIDM obtained through the signal from the base station does not coincide with the SIDAn stored in the ID-ROM, the user may distinguish this state from the apparatus being out of order.

The stored SIDAn may be system identification numbers corresponding to unwilling systems with which the user does not wish the apparatus to be connected. However, when a new system with high fees is created, the user needs to store a new system identification number corresponding to the new unwilling system. On the contrary, in the above embodiment, the stored SIDAn are system identification numbers corresponding to willing systems with which the user wishes the apparatus to be connected. Therefore, the user does not need to store the new system identification number corresponding to the new unwilling system.

Figure 10:
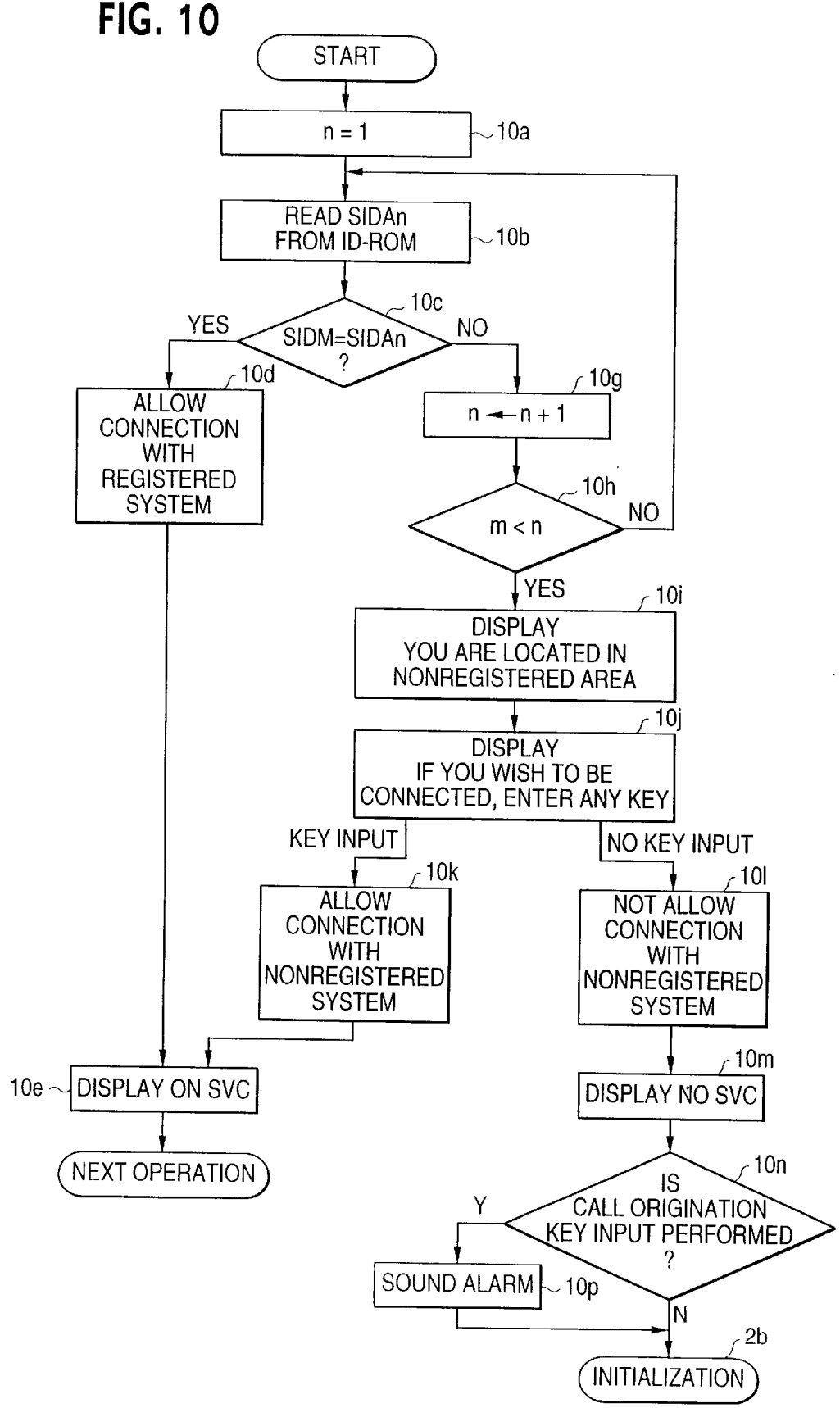
FIG. 10 is a flow chart illustrating a determining operation sequence according to another embodiment of the present invention.
Figure 11:
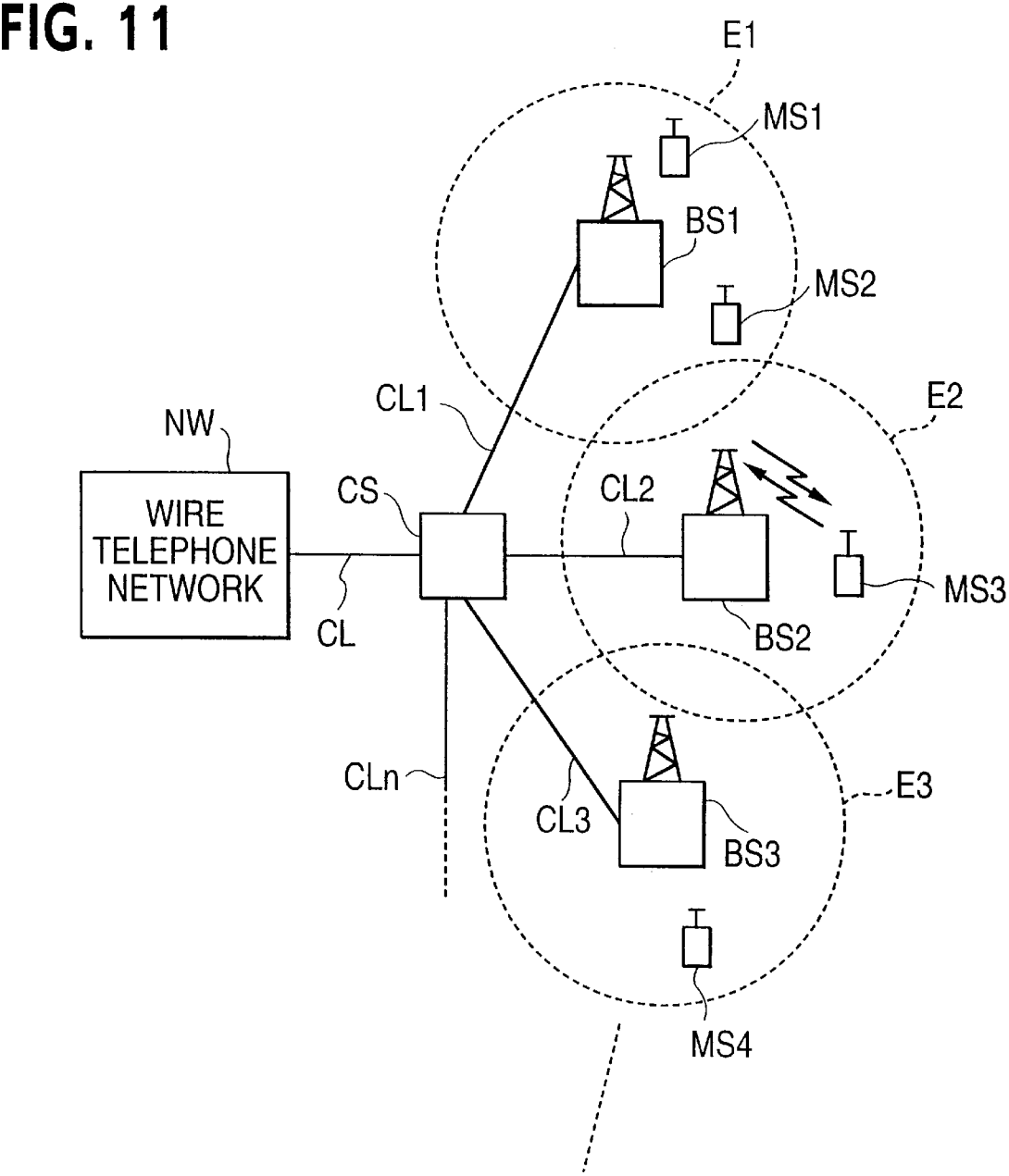
FIG. 11 is a block diagram illustrating a plurality of zones covered by base stations in a conventional cellular radio telephone system.

FIG. 10 illustrates another embodiment of a determining operation for determining whether to continue the sequence or not. This embodiment may be used in the initialization sequence, the incoming response sequence, and the call origination sequence. When the SIDM coincides with one of the stored SIDAn (step 10a, 10b, 10c), the apparatus is allowed to be connected with the system (step 10d). Thereafter, the apparatus displays "ON SVC" (step 10e). After that, the control circuit performs its next operation.

When the SIDM does not coincide with any of the SIDAn (n=1–m) (step 10c, 10g, 10h), the apparatus displays "YOU ARE LOCATED IN NONREGISTERED AREA" (step 10i). Thereafter, the apparatus displays "IF YOU WISH TO BE CONNECTED, ENTER ANY KEY". This information means that a link with the apparatus is awaiting the user's response on whether the user wishes the apparatus to be connected with the unwilling (nonregistered) system having a system identification number which is not stored in the ID-ROM 33.

When the user's key input is performed, the apparatus is allowed to be connected with the nonregistered system (step 10k), and displays "ON SVC" and performs the next operation (step 10e).

When the user's key input is not performed within a predetermined period of time, the apparatus is not allowed to be connected with the nonregistered system (step 10l). Thereafter, the apparatus displays "NO SVC" (step 10m). In this state, if a call origination key input is operated within a predetermined period of time (step 10n), the control circuit sounds an alarm (step 10p). Otherwise, initialization is resumed (step 2b).

Furthermore, if a call origination key input is operated within a predetermined period of time, the control circuit may inform a user that the apparatus is unabled to be used by means of a LCD or a diode giving light.

This embodiment enables the user to confirm whether the apparatus is connected with the system having a system identification number which is not stored in the ID-ROM 33.

Furthermore, the content of the information on the LCD may indicate that the apparatus is unable to be connected to the system.

Although in the above embodiment the number of the stored SIDAn is "m", the value of "m" may be one or more.

Although in the above embodiment the control circuit urges the user to input information necessary for enabling communication, the control circuit may urge the user to input other information necessary for disabling communication in another embodiment.

Although in the above embodiment the control circuit displays the result of the comparison and information for urging the user to determine whether to continue the sequence, a voice synthesizer may generate a synthesized voice corresponding to this information.

Although embodiments applied to a mobile telephone apparatus have been described, it is apparent to those skilled in this art that this invention may be easily applied to any kind of radio telecommunication apparatus, for example, to a portable type radio telephone. This invention also is applicable to an apparatus adopting an analog modulating system and a dual mode apparatus adopting one of a digital modulating system or an analog modulating system. Further, the concepts of the present invention may be applied to a data transmission apparatus used in a cellular radio telecommunication system.

We claim:

1. Radio telecommunication apparatus for use in a radio telecommunication system, wherein the radio telecommunication system encompasses a plurality of areas each having one or more base units which broadcast a system identification number over one or more radio channels within the area of the base units, the radio telecommunication apparatus comprising:

receiving means for receiving a system identification number;

storing means for storing at least one system identification number;

comparing means coupled to said receiving means and said storing means for comparing said received system identification number with each of said at least one stored system identification number;

urging means responsive to said comparing means for urging a user to input an indicating signal necessary for selecting between enabling a communication with the base unit which broadcast the received system identification number and disabling said communication if the received system identification number does not coincide with any one of said at least one stored system identification number; and enabling means for enabling said communication if said received system identification number coincides with one of said at least one stored system identification number and for enabling said communication if said received system identification number does not coincide with any one of said at least one stored system identification number only when said indicating signal is input.

2. The apparatus of claim 1 further comprising disabling means for disabling said communication if said indicating signal is not input within a predetermined period of time.

3. The apparatus of claim 1 wherein said enabling means enables said communication if said indicating signal is input within a predetermined period of time.

4. The apparatus of claim 1 wherein said comparing means further generates an output signal, said apparatus further comprising informing means responsive to said comparing means for informing a user of information relating to said output signal if said received system identification number does not coincide with any one of said at least one stored system identification number.

5. The apparatus of claim 1 wherein said comparing means further generates an output signal, said apparatus further comprising displaying means responsive to said comparing means for displaying information relating to said output signal if said received system identification number does not coincide with any one of said at least one stored system identification number.

6. The apparatus of claim 1 wherein said comparing means further generates an output signal, said apparatus further comprising voice synthesis means responsive to said comparing means for generating a synthesized voice corresponding to information relating to said output signal if said received system identification number does not coincide with any one of said at least one stored system identification number.

7. The apparatus of claim 1 wherein said enabling means further generates an output signal, said apparatus further comprising informing means responsive to said enabling means for informing a user of information relating to the output signal.

8. The apparatus of claim 1 wherein said enabling means further generates an output signal, said the apparatus further comprising displaying means responsive to said enabling means for displaying information relating to said output signal.

9. The apparatus of claim 1 wherein said enabling means further generates an output signal, said apparatus further comprising voice synthesis means responsive to said enabling means for generating a synthesized voice corresponding to information relating to said output signal.

10. The apparatus of claim 1, further comprising:

selecting means responsive to said enabling means for selecting a channel;

means for receiving another system identification number over said channel;

means for comparing said received another system identification number with each of said at least one stored system identification number;

means for urging the user to input an indicating signal necessary for selecting between enabling a communication with the base unit which broadcast said another system identification number and disabling said communication if said received another system identification number does not coincide with any one of said at least one stored system identification number; and means for enabling a communication with said base unit if said received another system identification number coincides with one of said at least one stored system identification number and for enabling said communication if said received another system identification number does not coincide with any one of said at least one stored system identification number only when said indicating signal is input.

11. Radio telecommunication apparatus for use in a radio telecommunication system, wherein the radio telecommunication system encompasses a plurality of areas each having one or more base units which broadcast a system identification number over one or more radio channels within the area of the base units, the radio telecommunication apparatus comprising:

receiving means for receiving a system identification number;

storing means for storing a plurality of system identification numbers of systems for which communication is enabled; and disabling means responsive to said receiving means and said storing means for automatically disabling communication with said base unit if said received system identification number does not coincide with any one of said stored system identification numbers.

12. The apparatus of claim 11, wherein said disabling means further generates an output signal, said apparatus further comprising informing means responsive to said disabling means for informing a user of information relating to the output signal.

13. The apparatus of claim 11, wherein said disabling means further generates an output signal, said apparatus further comprising displaying means responsive to said disabling means for displaying information relating to the output signal.

14. The apparatus of claim 11, wherein said disabling means further generates an output signal, said apparatus further comprising voice synthesis means responsive to said disabling means for generating a synthesized voice relating to the output signal.

15. The apparatus of claim 11, wherein said disabling means further produces an output signal, said apparatus further comprising:

informing means responsive to said disabling means for informing a user of information relating to the output signal.

16. The apparatus of claim 11, wherein said disabling means further produces an output signal, said apparatus further comprising:

displaying means responsive to said disabling means for displaying a user information relating to the output signal.

17. The apparatus of claim 11, wherein said disabling means further produces an output signal, said apparatus further comprising:

voice synthesis means responsive to said disabling means for generating a synthesized voice corresponding to information relating to the output signal.

18. The apparatus of claim 11 wherein said disabling means further generates an output signal, said apparatus further comprising informing means responsive to said disabling means for informing a user of information relating to the output signal.

19. The apparatus of claim 11 wherein said disabling means further generates an output signal, said apparatus further comprising displaying means responsive to said disabling means for displaying information relating to the output signal.

20. The apparatus of claim 11, wherein said disabling means further generates an output signal, said apparatus further comprising voice synthesis means responsive to said disabling means for generating a synthesized voice relating to the output signal.

21. Radio telecommunication apparatus for use in a radio telecommunication system, wherein the radio telecommunication system encompasses a plurality of areas each having one or more base units which broadcast a system identification number over one or more radio channels within the area of the base units, the radio telecommunication apparatus comprising:

receiving means for receiving a system identification number;

storing means for storing a plurality of system identification numbers;

comparing means coupled to said receiving means and said storing means for comparing said received system identification number with each of said stored system identification numbers;

selecting means responsive to said comparing means for selecting between enabling communication with the base unit which broadcast said received system identification number and disabling communication with said base unit; and enabling means for enabling communication if said received system identification number does not coincide with any one of said stored system identification numbers only when said selecting means selects to enable said communication.

22. The apparatus of claim 21 wherein said selecting means further generates an output signal, said apparatus further comprising informing means responsive to said selecting means for informing a user of information relating to said output signal.

23. The apparatus of claim 21 wherein said selecting means further generates an output signal, said apparatus further comprising displaying means responsive to said selecting means for displaying information relating to said output signal.

24. The apparatus of claim 21 wherein said selecting means further generates an output signal, said apparatus further comprising voice synthesis means responsive to said selecting means for generating a synthesized voice corresponding to information relating to said output signal.

25. Radio telecommunication apparatus comprising:

receiving means for receiving a system identification number;

storing means for storing at least one system identification number;

comparing means coupled to said receiving means and said storing means for comparing said received system identification number with each of said at least one stored system identification number;

urging means responsive to said comparing means for urging a user to input an indicating signal necessary for selecting between enabling communication with the base unit which broadcast the received system identification number and disabling said communication if the received system identification number does not coincide with one of said at least one stored system identification number; and enabling means for enabling access to a channel if said received system identification number coincides with one of said at least one stored system identification number and for enabling said communication if said received system identification number does not coincide with any one of said at least one stored system identification number only when said indicating signal is input.

26. The apparatus of claim 25 wherein said channel is a channel over which a message may be transmitted from a user of said apparatus.

27. Radio telecommunications apparatus comprising:

receiving means for receiving a system identification number;

storing means for storing a plurality of system identification numbers of systems for which communication is enabled; and disabling means responsive to said receiving means and said storing means for automatically disabling access to a channel if said received system identification information does not coincide with any one of said stored system identification numbers.

28. The apparatus of claim 27, further comprising:
enabling means for enabling a communication with a base unit if said received system identification number coincides with one of said at least one stored system identification number.

29. The apparatus of claim 27, wherein said disabling means further produces an output signal, said apparatus further comprising:
informing means responsive to said disabling means for informing a user of information relating to the output signal.

30. The apparatus of claim 27, wherein said disabling means further produces an output signal, said apparatus further comprising:
displaying means responsive to said disabling means for displaying a user information relating to the output signal.

31. The apparatus of claim 27, wherein said disabling means further produces an output signal, said apparatus further comprising:
voice synthesis means responsive to said disabling means for generating a synthesized voice corresponding to information relating to the output signal.

32. The apparatus of claim 27, wherein said channel is a channel over which a message may be transmitted from a user of the apparatus.

33. Radio telecommunication apparatus for use in a radio telecommunication system, in which said apparatus selects a first channel from a base unit associated with a radio system and detects a first system identification number over said first channel, the apparatus comprising:
storing means for storing a plurality of system identification numbers of systems for which communication is enabled;
first enabling means responsive to said storing means for enabling communication with said base unit if said first system identification number coincides with any one of said stored system identification numbers;
first disabling means responsive to said storing means for automatically disabling communication with said base unit if said first system identification number does not coincide with any one of said stored system identification numbers;
selecting means responsive to said first enabling means for selecting a second channel;
receiving means responsive to said selecting means for receiving a second system identification number over said second channel;
second enabling means responsive to said receiving means and said storing means for enabling communication with said base unit if said second system identification number coincides with any one of said stored system identification numbers; and
second disabling means responsive to said receiving means and said storing means for automatically disabling communication with said base unit if said second system identification number does not coincide with any one of said stored system identification numbers.

34. A method of enabling a radio telecommunication apparatus for use in a radio telecommunication system, wherein the radio telecommunication system encompasses a plurality of areas each having one or more base units which broadcast a system identification number over one or more radio channels within the area of said base units, the method comprising the steps of:
storing at least one system identification number;
receiving a system identification number;
comparing said received system identification number with each of said at least one stored system identification number;
urging a user to input an indicating signal necessary for selecting between enabling a communication with the base unit which broadcast the received system identification number and disabling said communication, if the received system identification number does not coincide with one of said at least one stored system identification number;
enabling said communication if said received system identification number coincides with one of said at least one stored system identification number; and
enabling said communication if said received system identification number does not coincide with any one of said at least one stored system identification number only when said indicating signal is input.

35. A radio telecommunication apparatus for use in a radio telecommunication system, wherein the radio telecommunication system encompasses a plurality of areas each having one or more base units which broadcast a system identification number over one or more radio channels within the area of the base units, the radio telecommunication apparatus comprising:
selecting means for selecting a channel;
receiving means for receiving a system identification number over said selected channel;
storing means for storing a plurality of system identification numbers of systems for which communication is enabled; and
disabling means responsive to said receiving means and said storing means for automatically disabling communication with said base unit over said channel if said received system identification number does not coincide with any one of said stored system identification numbers.

36. The apparatus of claim 35, wherein said disabling means further produces an output signal, said apparatus further comprising:
informing means responsive to said disabling means for informing a user of information relating to the output signal.

37. The apparatus of claim 35, wherein said disabling means further produces an output signal, said apparatus further comprising:
displaying means responsive to said disabling means for displaying a user information relating to the output signal.

38. The apparatus of claim 35, wherein said disabling means further produces an output signal, said apparatus further comprising:
voice synthesis means responsive to said disabling means for generating a synthesized voice corresponding to information relating to the output signal.

39. A radio telecommunication apparatus for use in a radio telecommunication system, wherein the radio telecommunication system encompasses a plurality of areas each having one or more base units which broadcast a system identification number over one or more radio channels within the area of the base units, the radio telecommunication apparatus comprising:

selecting means for selecting a channel;

receiving means for receiving a system identification number over said selected channel;

storing means for storing a plurality of system identification numbers of systems for which communication is enabled;

enabling means responsive to said receiving means and said storing means for enabling communication with said base unit over said channel if said received system identification number coincides with one of said stored system identification numbers; and disabling means responsive to said receiving means and said storing means for automatically disabling communication with said base unit over said channel if said received system identification number does not coincide with any of said stored system identification numbers.

40. The apparatus of claim 39, wherein said disabling means further produces an output signal, said apparatus further comprising:

informing means responsive to said disabling means for informing a user of information relating to the output signal.

41. The apparatus of claim 39, wherein said disabling means further produces an output signal, said apparatus further comprising:

displaying means responsive to said disabling means for displaying a user information relating to the output signal.

42. The apparatus of claim 39, wherein said disabling means further produces an output signal, said apparatus further comprising:

voice synthesis means responsive to said disabling means for generating a synthesized voice corresponding to information relating to the output signal.

43. A radio telecommunication apparatus for use in a radio telecommunication system, wherein the radio telecommunication system encompasses a plurality of areas each having one or more base units which broadcast a system identification number over one or more radio channels within the area of the base units, the radio telecommunication apparatus comprising:

a receiver, said receiver receiving a system identification number;

a memory, said memory storing a plurality of system identification numbers of systems for which communication is enabled; and a disabling circuit responsive to said receiver and said memory, said disabling circuit automatically disabling communication with said base unit if said received system identification number does not coincide with any one of said stored system identification numbers.

44. A radio telecommunications apparatus comprising:

a receiver, said receiver receiving a system identification number;

a memory, said memory storing a plurality of system identification numbers of systems for which communication is enabled; and a disabling circuit responsive to said receiver and said memory, said disabling circuit automatically disabling access to a channel if said received system identification information does not coincide with any one of said stored system identification numbers.

45. A radio telecommunication apparatus for use in a radio telecommunication system, wherein the radio telecommunication system encompasses a plurality of areas each having one or more base units which broadcast a system identification number over one or more radio channels within the area of the base units, the radio telecommunication apparatus comprising:

a selecting circuit, said selecting circuit selecting a channel;

a receiver, said receiver receiving a system identification number over said channel selected by said selecting circuit;

a memory, said memory storing a plurality of system identification numbers of systems for which communication is enabled; and a disabling circuit responsive to said receiver and said memory, said disabling circuit automatically disabling communication with said base unit over said channel if said received system identification number does not coincide with any one of said stored system identification numbers.

46. A radio telecommunication apparatus for use in a radio telecommunication system, wherein the radio telecommunication system encompasses a plurality of areas each having one or more base units which broadcast a system identification number over one or more radio channels within the area of the base units, the radio telecommunication apparatus comprising:

a selecting circuit, said selecting circuit selecting a channel;

a receiver, said receiver receiving a system identification number over said channel selected by said selecting circuit;

a memory, said memory storing a plurality of system identification numbers of systems for which communication is enabled;

an enabling circuit responsive to said receiver and said memory, said enabling circuit enabling communication with said base unit over said channel if said received system identification number coincides with one of said stored system identification numbers; and a disabling circuit responsive to said receiver and said memory, said disabling circuit automatically disabling communication with said base unit over said channel if said received system identification number does not coincide with any of said stored system identification numbers.

47. A method for radio telecommunications for use in a radio telecommunication system, wherein the radio telecommunication system encompasses a plurality of areas each having one or more base units which broadcast a system identification number over one or more radio channels within the area of the base units, the method for radio telecommunications comprising the steps of:

receiving a system identification number from said radio telecommunication system;

storing a plurality of system identification numbers of systems for which communication is enabled; and automatically disabling communication with said base unit if said received system identification number does not coincide with any one of said stored system identification numbers.

48. A method for radio telecommunications comprising the steps of:

receiving a system identification number from a radio telecommunication system;

storing a plurality of system identification numbers of systems for which communication is enabled; and automatically disabling access to a channel if said received system identification information does not coincide with any one of said stored system identification numbers.

49. A method for radio telecommunications for use in a radio telecommunication system, wherein the radio telecommunication system encompasses a plurality of areas each having one or more base units which broadcast a system identification number over one or more radio channels within the area of the base units, the method for radio telecommunications comprising the steps of:

selecting a channel;

receiving a system identification number from said radio telecommunication system over said selected channel;

storing a plurality of system identification numbers of systems for which communication is enabled; and automatically disabling communication with said base unit over said channel if said received system identification number does not coincide with any one of said stored system identification numbers.

50. A method for radio telecommunications for use in a radio telecommunication system, wherein the radio telecommunication system encompasses a plurality of areas each having one or more base units which broadcast a system identification number over one or more radio channels within the area of the base units, the method for radio telecommunications comprising the steps of:

selecting a channel;

receiving a system identification number from said radio telecommunication system over said selected channel;

storing a plurality of system identification numbers of systems for which communication is enabled;

enabling communication with said base unit over said channel if said received system identification number coincides with one of said stored system identification numbers; and automatically disabling communication with said base unit over said channel if said received system identification number does not coincide with any of said stored system identification numbers.

* * * * *